United States Patent
Parsche

(12) 
(10) Patent No.: US 11,600,926 B2
(45) Date of Patent: Mar. 7, 2023

(54) ELORAN RECEIVER AND ANTENNA WITH FERROMAGNETIC BODY AND WINDINGS AND RELATED METHODS

(71) Applicant: Eagle Technology, LLC, Melbourne, FL (US)

(72) Inventor: Francis E. Parsche, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 808 days.

(21) Appl. No.: 16/419,568

(22) Filed: May 22, 2019

(65) Prior Publication Data

US 2020/0371187 A1 Nov. 26, 2020

(51) Int. Cl.
| | |
|---|---|
| *H01Q 7/08* | (2006.01) |
| *H01Q 9/36* | (2006.01) |
| *H01Q 9/44* | (2006.01) |
| *H01Q 1/32* | (2006.01) |
| *H01Q 9/04* | (2006.01) |
| *H01Q 21/28* | (2006.01) |
| *H01Q 7/06* | (2006.01) |

(52) U.S. Cl.
CPC ............. *H01Q 7/08* (2013.01); *H01Q 1/3233* (2013.01); *H01Q 9/0407* (2013.01); *H01Q 9/36* (2013.01); *H01Q 9/44* (2013.01); *H01Q 21/28* (2013.01); *H01Q 7/06* (2013.01)

(58) Field of Classification Search
CPC .......... H01Q 1/32; H01Q 1/3275; H01Q 1/34; H01Q 7/06; H01Q 9/0407; H01Q 21/28; H01Q 21/29; H01Q 7/08
See application file for complete search history.

(56) References Cited

U.S. PATENT DOCUMENTS

| | | | |
|---|---|---|---|
| 3,947,849 | A | 3/1976 | Fehlner et al. |
| 4,024,382 | A | 5/1977 | Fowler |
| 4,134,117 | A | 1/1979 | Robinson et al. |
| 4,166,275 | A | 8/1979 | Michaels et al. |
| 4,195,299 | A | 3/1980 | Van Etten |
| 4,268,830 | A | 5/1981 | Brodeur |
| 4,300,139 | A | 11/1981 | Wurst et al. |
| 4,325,067 | A | 4/1982 | Brodeur |
| RE31,254 | E | 5/1983 | Brodeur |
| 4,743,912 | A | 5/1988 | Enge et al. |
| 4,804,964 | A | 2/1989 | Takai et al. |

(Continued)

OTHER PUBLICATIONS

"Antenna Fundamentals" (May 3, 2007). Interference Technology https://interferencetechnology.com/antenna-fundamentals/ (Accessed Feb. 3, 2022) (Year: 2007).*

(Continued)

*Primary Examiner* — Ab Salam Alkassim, Jr.
*Assistant Examiner* — Anh N Ho
(74) *Attorney, Agent, or Firm* — Allen, Dyer, Doppelt + Gilchrist, P.A.

(57) ABSTRACT

An eLORAN receiver may include an antenna and eLORAN receiver circuitry coupled to the antenna. The antenna may have a ferromagnetic core including a ferromagnetic medial portion and ferromagnetic arms extending outwardly from the ferromagnetic medial portion, a respective electrically conductive winding surrounding each of the ferromagnetic arms, and an electrically conductive patch element adjacent the ferromagnetic core.

14 Claims, 9 Drawing Sheets

(56) References Cited

U.S. PATENT DOCUMENTS

| | | | |
|---|---|---|---|
| 4,999,638 | A | 3/1991 | Schick |
| 5,278,568 | A | 1/1994 | Enge et al. |
| 5,563,611 | A | 10/1996 | McGann et al. |
| 6,014,111 | A | 1/2000 | Johannessen |
| 6,539,306 | B2 | 3/2003 | Turnbull |
| 6,873,300 | B2 | 3/2005 | Mendenhall |
| 7,782,983 | B2 | 8/2010 | Parakh et al. |
| 2004/0032363 | A1 | 2/2004 | Schantz et al. |
| 2007/0120739 | A1* | 5/2007 | Johanessen ............ H01Q 23/00 342/388 |
| 2008/0186232 | A1 | 8/2008 | Johannessen |
| 2010/0103025 | A1* | 4/2010 | Schantz ................. G01S 11/06 342/174 |
| 2012/0299793 | A1* | 11/2012 | McLaughlin ........ H01Q 9/0407 343/848 |
| 2017/0160370 | A1* | 6/2017 | Yakubisin ............... G01S 1/245 |

OTHER PUBLICATIONS

Shahin Farahani, ZigBee Wireless Networks and Transceivers, 2008, pp. 199 (Year: 2008).*

"Feed Line" (Dec. 21, 2016). Techopedia. https://www.techopedia.com/definition/16795/feed-line (Accessed Jan. 28, 2022) (Year: 2016).*

Joel Schopis, Single-Element GNSS Patch Antenna Pattern Control, Aug. 2015 (Year: 2015).*

Simpson, "The Disk Loaded Monopole Antenna", IEEE Transactions on Antennas and Propagation, vol. 52, No. 2, Feb. 2004, pp. 542-550.

Jie et al., "Application Research of H-field Antenna in Enhanced Loran", 3rd International Conference on Computer and Electrical Engineering, IPCSIT, vol. 53, 2010, pp. 1-5.

U.S. Appl. No. 16/013,106, filed May 16, 2018 Parsche et al.

U.S. Appl. No. 16/013,106, filed Jun. 20, 2018 Parsche et al.

Chu, L. J., "Physical limitations of omnidirectional antennas" Journal of Applied Physics 19; Dec. 1948; pp. 1163-1175. Abstract Only.

* cited by examiner

ELORAN RECEIVER AND ANTENNA WITH FERROMAGNETIC BODY AND WINDINGS AND RELATED METHODS

TECHNICAL FIELD

The present disclosure relates to the field of communication systems, and, more particularly, to radio frequency antennas and related methods.

BACKGROUND

For radio frequency (RF) communications in the very low frequency (VLF), low frequency (LF), and medium frequency (MF) ranges, for example, relatively large ground-based antenna towers are used for transmitting such signals. Such antenna configurations may include a tower several hundred feet in height connected to the ground at its base, with numerous guy wires connecting the tower to ground for stability.

One example medium wave antenna system is disclosed in U.S. Pat. No. 6,873,300 to Mendenhall. This patent discloses an antenna system including an electrically conductive radiating mast that extends generally vertical relative to earth ground. The mast has a lower end for receiving RF energy for radiation thereby at an operating RF frequency, and an upper end. A plurality of N radial, electrically conductive, wires is provided with each having an inner end and an outer end. The inner ends of the radial wires are electrically connected together and located proximate to the vertical mast. The radial wires are elevated throughout their lengths above the level of earth ground and extend radially outward from the vertical mast. A tuning device, such as an adjustable inductor, is connected to the radial wires for adjusting the impedance thereof such that the radial wires resonate at the operating frequency.

Another example where large scale tower based antennas are used is low frequency transmission stations for navigation systems, such as the long range navigation (LORAN) system. LORAN was developed in the United States and Britain during World War II. Subsequent implementations provided for enhancements in accuracy and usefulness, including LORAN-C and the later enhanced LOng-RAnge Navigation (eLORAN) implementations. More particularly, eLORAN is a low frequency radio navigation system that operates in the frequency band of 90 to 110 kHz. Low frequency eLORAN transmissions can propagate by ground wave, a type of surface wave that hugs the earth. Ionospheric reflections or sky waves are another significant mechanism of eLORAN wave propagation. With typical low frequency antennas, the tower itself is used as a monopole antenna. Because of the height of the tower, which may be 600 feet or more as a result of the operating wavelength, many upper wires connect to the tower top forming a resonating capacitor. These wires, known as top loading elements (TLEs), may approximate a solid cone.

eLORAN may operate at low frequencies, such as 100 kHz, making the transmit antenna physical size large. Yet, in eLORAN, the antenna electrical size is small relative to the wavelength. Physics may limit the electrically small antenna fixed tuned bandwidth. One theory is the Chu Limit as described in the reference "Physical limitations of omnidirectional antennas", Chu, L. J. (December 1948), Journal of Applied Physics 19: 1163-1175, which is called out as a reference herein. The Chu Bandwidth Limit equation may be $Q=1/kr^3$, where Q is a dimensionless number relating to bandwidth, k is the wave number=$2\pi/\lambda$, and r is the radius of a spherical analysis volume enclosing the antenna. Antenna radiation bandwidth is a matter of considerable importance to eLORAN as it enables sharp eLORAN pulses with fast rise times to be transmitted.

While high radiation efficiency is needed in transmit antennas, high antenna efficiency is not required for eLORAN receive antennas. This is because naturally occurring "atmospheric noise" is abundant at the low frequencies used by eLORAN. As atmospheric noise is a matter of considerable importance in spectral allocation, it is cataloged by the International Telecommunications Union as the report "Radio Noise", Recommendation ITU-R P.372-8, FIG. 2 "Fa Versus Frequency". Curves B and A of this report indicate that at 100 kHz frequency atmospheric noise is 77 dB above the antenna thermal noise in quiet natural conditions and that manmade noise is 140 dB above antenna thermal noise in high manmade noise conditions, i.e. there is significant "static" so to speak. Assuming a receiver noise figure (transistor thermal noise) contribution of about 10 dB, and knowing the directivity of an electrically small antenna cannot exceed 1.8 dB, the required receive antenna gain to resolve to natural noise in quiet conditions is −77+10+1.8=−65 dBi or decibels with respect or isotropic. At eLORAN frequencies, small antennas therefore suffice for reception.

Antennas to receive eLoran transmissions are categorized as to E-field and H-field types. E-field antennas may be whips or patches, while H-field types may be circles or windings. The E-field types are based on the divergence of electric current and are related to the dipoles and monopoles. The H-field types are based on the curl of electric current and therefore relate to loops and half loops. Both E-field and H-field antenna types respond to the far field radio waves providing useful reception. Further, both the E-field and H-field antenna types respond to both the E-fields and H-fields present in the far field radio wave.

There are many trades between the two receive antenna types. Important differences exist between the near field responses of the E-field and H-field antenna types. The E-field type has a strong radial E-field reactive near field response. Differently, the H-field type has a strong radial H-field reactive near field response. E-field antennas may pick up manmade electromagnetic interference (EMI) more than H-field antenna types. The accessories of man, such as high voltages powerlines, result in considerable charge separation and strong E-field EMI, to which the E-field type receive antenna will respond. The E-field antenna type is however-useful for compactness and sensitivity. The H-field receive antenna may offer improved rejection of local EMI, rejection of P static or noise due to electric charge buildup, and direction of arrival information. Disadvantages of the H-field antenna may include increased cost as ferrite rods may be used.

With the rise of satellite based navigation systems, such as the Global Positioning System (GPS), there has been relatively little development or investment in terrestrial-based navigation systems, such as eLORAN, until recently. A renewed interest in such systems has arisen as a backup to satellite navigation systems, particularly since low frequency eLORAN signals are less susceptible to jamming or spoofing compared to the relatively higher frequency GPS signals. As such, further developments in eLORAN antenna systems may be desirable in certain applications.

As noted above, given the operational frequency of eLORAN systems and the typical deployment in land vehicles and watercraft, the design of the eLORAN antenna may present unique design issues. In particular, given the mobile application of the eLORAN antenna, the antenna may desirably be small sized and durable. It is important that eLORAN receive antennas work in the complex environments of man to deliver accurate navigation and time.

SUMMARY

Generally, an eLORAN receiver may include an antenna and eLORAN receiver circuitry coupled thereto. The antenna may comprise a ferromagnetic core comprising a ferromagnetic medial portion and a plurality of ferromagnetic arms extending outwardly therefrom, and a respective electrically conductive winding surrounding each of the plurality of ferromagnetic arms. The antenna may further include an electrically conductive patch element adjacent the ferromagnetic core.

In particular, the ferromagnetic core and respective electrically conductive windings may be configured to respond a plurality of H-field signals, and the electrically conductive patch element may be configured to respond an E-field signal. The eLORAN receiver circuitry may be configured to correct a position based upon the plurality of H-field signals and the E-field signal. The eLORAN receiver circuitry may be configured to calculate an E-field to H-field amplitude ratio, an E-field to H-field phase difference, and an E-field to H-field pulse arrival time difference. The eLORAN receiver circuitry may be configured to correct the position based upon the E-field to H-field amplitude ratio, the E-field to H-field phase difference, and the E-field to H-field pulse arrival time difference.

In some embodiments, the antenna may comprise an electrically conductive ground plane opposite the electrically conductive patch element. The plurality of ferromagnetic arms may be arranged in aligned pairs. The antenna may comprise at least one feed point coupled to the respective electrically conductive winding and the electrically conductive patch element.

Additionally, the electrically conductive patch element may be disc-shaped. The plurality of ferromagnetic arms may define a cross-shape. The ferromagnetic core may comprise at least one of ferrite, powdered iron, electrical steel, and nanocrystalline iron, for example.

Another aspect is directed to an antenna to be coupled to eLORAN receiver circuitry. The antenna may comprise a ferromagnetic core comprising a ferromagnetic medial portion and a plurality of ferromagnetic arms extending outwardly therefrom, and a respective electrically conductive winding surrounding each of the plurality of ferromagnetic arms. The antenna may include an electrically conductive patch element adjacent the ferromagnetic core.

Yet another aspect is directed to a method for making an antenna to be coupled to eLORAN receiver circuitry. The method may include forming a ferromagnetic core comprising a ferromagnetic medial portion and a plurality of ferromagnetic arms extending outwardly therefrom, and positioning a respective electrically conductive winding surrounding each of the plurality of ferromagnetic arms. The method may comprise positioning an electrically conductive patch element adjacent the ferromagnetic core.

DETAILED DESCRIPTION

The present disclosure will now be described more fully hereinafter with reference to the accompanying drawings, in which several embodiments of the present disclosure are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Figure 1:
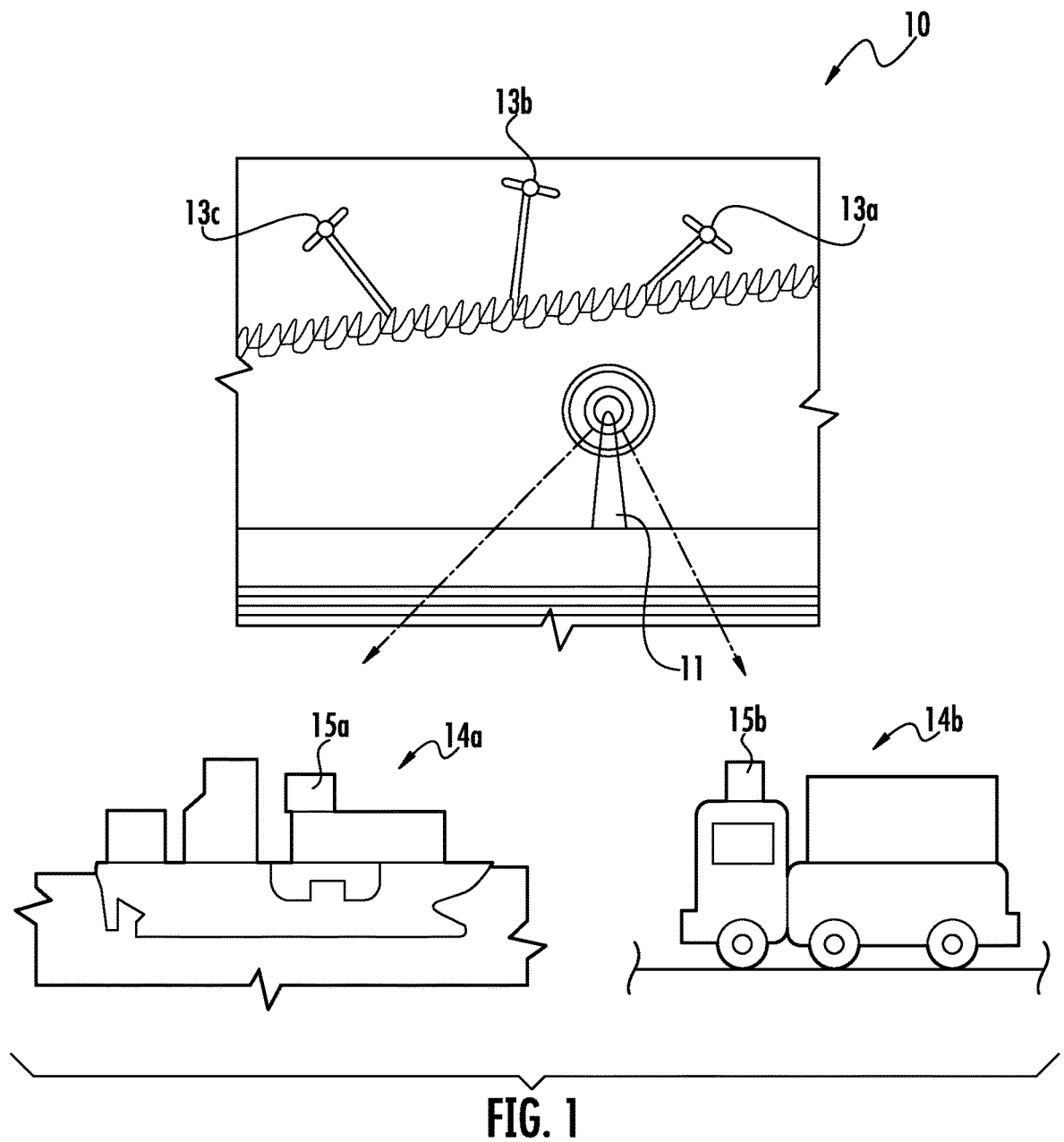
FIG. 1 is a schematic diagram of an eLORAN communication system, according to the present disclosure.
Figure 2:
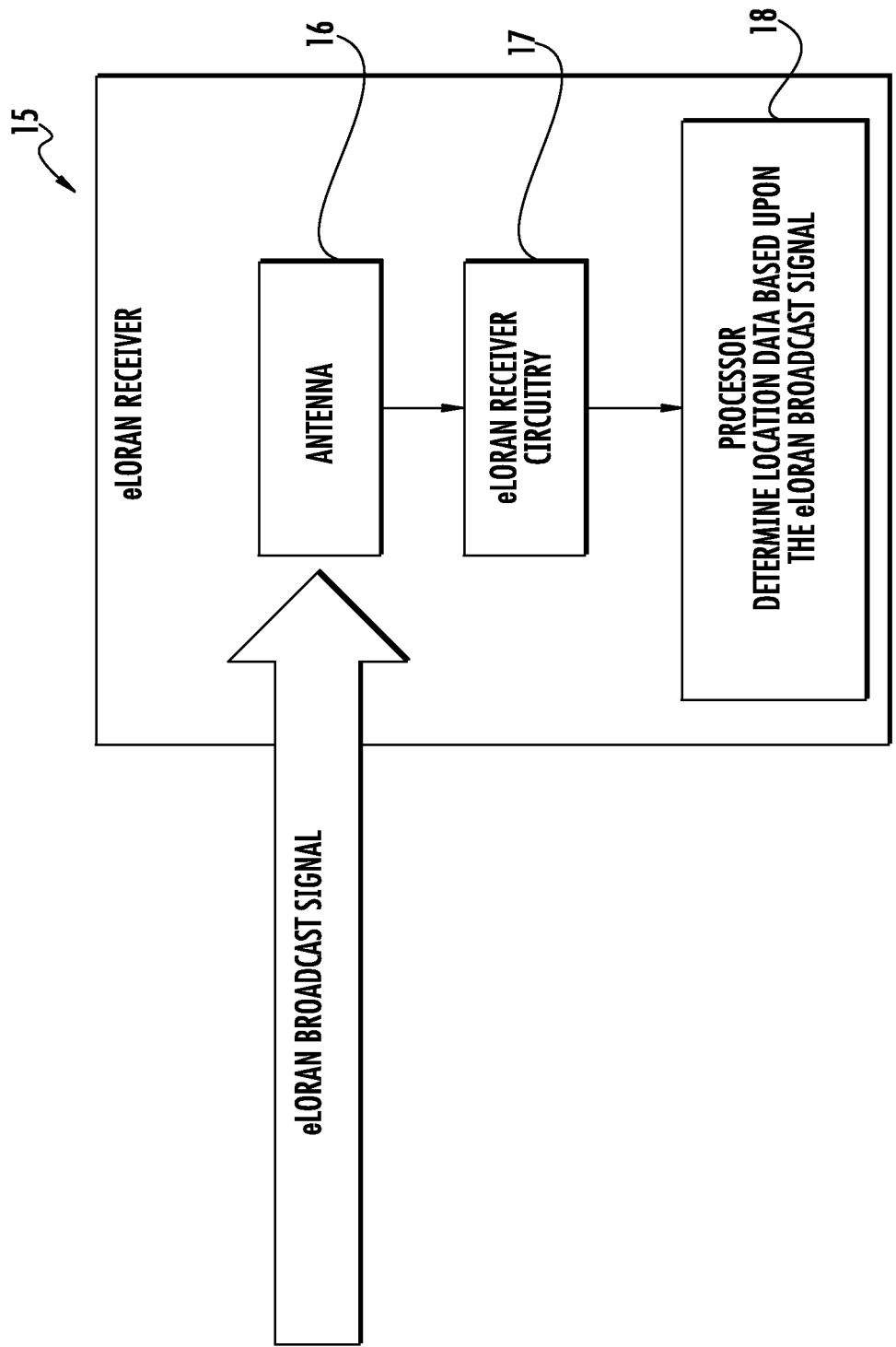
FIG. 2 is an eLORAN receiver from the eLORAN communication system of FIG. 1.
Figure 3:
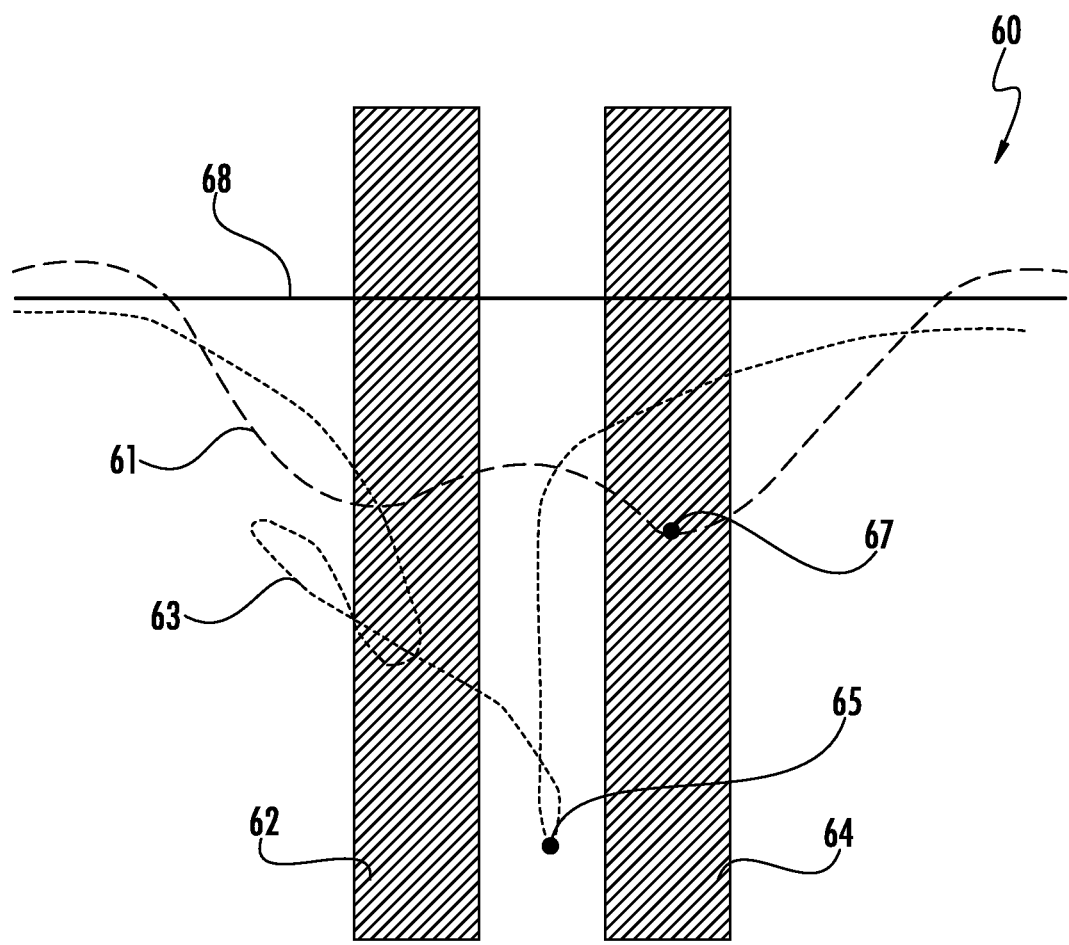
FIG. 3 is a chart of indicated LORAN position data taken near a bridge, according to the prior art.

Referring initially to FIGS. 1-3, an eLORAN communication system 10, according to the present disclosure, is now described. The eLORAN communication system 10 illustratively includes an eLORAN broadcast station 11 configured to transmit an eLORAN broadcast signal.

Although not part of the eLORAN communication system 10, a plurality of GPS satellites 13a-13c is depicted. It should be appreciated that due to the low power and high frequency nature of GPS signals from the plurality of GPS satellites 13a-13c, the respective GPS signals are readily subject to natural and man-made interference (e.g. spoofing, jamming). Because of this, it is helpful to provide the eLORAN communication system 10 as detailed herein.

The eLORAN communication system 10 illustratively includes a plurality of vehicles 14a-14b. In the illustrated embodiment, the plurality of vehicles 14a-14b illustratively includes a watercraft 14a, and a land based vehicle 14b. Each of the plurality of vehicles 14a-14b illustratively includes an eLORAN receiver 15a-15b configured to receive and process the eLORAN broadcast signal.

Each eLORAN receiver 15a-15b illustratively includes an antenna 16 and eLORAN receiver circuitry 17 coupled thereto. The eLORAN receiver 15a-15b illustratively includes a processor 18 coupled to the eLORAN receiver circuitry 17 and configured to determine position/location data based upon the eLORAN broadcast signal. As will be appreciated, the eLORAN receiver 15a-15b may include multiple internal receivers to receive and process the RF outputs of a plurality of receive antennas.

As will be appreciated by those skilled in the art, the antenna 16 is an H-field and E-field antenna. E-field antennas have a strong response to near electric fields, and H-field antennas have a strong response to near magnetic fields. Also, typical H-field antennas are closed electrical circuit loops, and E-field antennas are open circuit whips.

This issue with eLORAN generated position data is most pronounced in urban areas. Certain structures, such as buildings, bridges, overpasses, powerlines, may affect accuracy of the eLORAN position data. The cause of this inaccuracy is reradiation, mutual induction, and fringing fields, for example. The affected parameters in the eLORAN receive signal are E-field amplitude, H-field amplitude, E-field phase, H-field phase, polarization, absolute time delay for the E-field and H-field components of the incoming radio wave, and angle of arrival as discerned by the crossed loop H-field antennas.

For example, in the case of bridges, the eLORAN signal is delayed in time, which generates position data farther away from the eLORAN broadcast station 11 than the actual position. On the other hand, buildings advance the eLORAN signal in time, generating position data closer to the eLORAN broadcast station 11 than the actual position. In particular, overpasses and bridges emulate adjacent 1-turn inductor-loop antennas while buildings emulate adjacent monopole-capacitor antennas. The eLORAN receive antenna mutual couples to these adjacent "antenna" structures, which creates eLORAN broadcast signal receive issues.

Diagram 60 shows measured indicated position data over time for a prior art eLORAN device deployed on a watercraft while passing under two adjacent automobile bridges 62, 64. The actual watercraft course was substantially straight line and is denoted by a line 68. Trace 61 shows the indicated position from the prior art E-field antenna based eLORAN navigation system lacking the teachings of the present disclosure. Trace 63 shows the indicated position from a prior art H-field antenna eLORAN navigation system lacking the teachings of the present disclosure. In particular, the data shows the potential issues with eLORAN position data from prior art systems when operated near large land structures, such as the illustrated bridges 62, 64. Also to be seen are the differences in indicated position accuracy from the E-field and H-field systems; they are not the same. In the diagram 60, the H-field LORAN system had more indicated position error than the E-field LORAN system. As an aside, indicated GPS satellite navigation position (not shown) was also degraded by the bridges.

So in the diagram 60, example bridges 62, 64 propagation anomalies moved the eLORAN indicated position track away from actual position track. Looking closely, there are important differences in the position error reported by the E-field and H-field antenna. Maximum indicated error occurred between the bridges and there the H-field had an indicated position error of 110 meters southward of the actual position as depicted in the diagram 60 point 65. E-field had a maximum indicated position error of 30 meters southward of actual position as depicted by point 67. The indicated position errors occurred because of two factors: 1) coupling effects between the incoming LORAN signal and the bridge, and 2) coupling effects between H-field antennas and the bridge. A bridge behaves as large parasitic loop antenna and a tall building may behave as a parasitic monopole antenna. In practice, eLORAN receive antennas coupled by reactive near fields to nearby bridges and buildings, and those nearby bridges and buildings behave as loop or monopole antennas altering the amplitude and phase (or timing) of the incident eLORAN waves.

Primary parameters that the collocated by the E-field and H-field antennas of the present disclosure are:
1) E-field antenna amplitude
2) E-field antenna phase
3) Hx field antenna amplitude
4) Hx field antenna phase
5) Hy field antenna amplitude
6) Hy field antenna phase These 6 parameters provide an assessment of the near field conditions at the eLORAN receiver 15a, 15b site. Construction of a logic table in fact shows that $2^n$ or 64 pieces of information are derivable from comparison of two or more of the 6 afore mentioned primary antenna parameters. The methods of the invention include the following:

a) Angle of arrival (with one ambiguity) determination by comparison the Hx and Hy antenna phase difference;
b) Angle of arrival ambiguity (a) elimination by adding E-field antenna amplitude to the Hx, Hy channel amplitudes;
c) Proximity and direction to nearby bridges is indicated by an intensifying H-field antenna amplitude relative E-field amplitude;
d) Proximity and direction to a nearby building or tower is indicated by an intensifying E-field amplitude relative H-field amplitude;
e) Timing and indicated position error correction by applying a compensation factor based on the difference between E and Hx and Hy antenna amplitudes; and
f) Timing and indicated position error correction by applying a compensation factor based on the difference between E and Hx and Hy antenna phases.

It is also possible for the eLORAN receiver 15a,15b to reject the contribution of the eLORAN transmitting stations most impacted by near field proximity effects to nearby manmade structures, in favor of those eLORAN transmitting stations least impacted. This occurs by assessing anomalies in the relative E-field antenna to H-field antenna amplitudes and phases to determine the most timing errored station and the subsequent processor, which may include covariance matrix detection. The transmitted pulses from one eLORAN transmitting station may not be impacted by near field coupling to adjacent structures while another is. In particular, the up-signal station signals will be the least impacted by nearby structure, e.g. the eLORAN transmitting station signals that have not passes through or by the nearby obstructions can be least errored in time and selected. The two crossed H-field antennas provide the direction of arrival.

Referring now to FIGS. 4A-4C & 5, the antenna 16 may provide an approach to these eLORAN position accuracy issues, and illustratively comprises a ferromagnetic core 20 comprising a ferromagnetic medial portion 21, and a plurality of ferromagnetic arms 22a-22d extending outwardly therefrom. Each of the plurality of ferromagnetic arms 22a-22d is cylinder-shaped. In other embodiments, other shapes can be used, such as a rectangular box shape, or a cone, for example.

The plurality of ferromagnetic arms 22a-22d are illustratively arranged in aligned pairs, and define a cross-shape (i.e. the aligned pairs are substantially orthogonal to each other: 90°±10°) for creating sine and cosine radiation patterns. The ferromagnetic core 20 may be a substantially bulk nonconductive ferromagnetic core comprising at least one of ferrite, powdered iron, electrical steel, and nanocrystalline iron, for example.

The antenna 16 includes a respective electrically conductive winding 23a-23d surrounding each of the plurality of ferromagnetic arms 22a-22d. Each of the respective electrically conductive winding 23a-23d is illustratively wound into a helix shape. In some embodiments, each electrically conductive winding 23a-23d comprises a metallic winding comprising at least one of copper, aluminum, silver, and gold (i.e. an alloy).

The antenna 16 includes an electrically conductive patch element 24 adjacent the ferromagnetic core 20. As perhaps best seen in FIG. 4C, the electrically conductive patch element 24 is disc-shaped, in particular, circular disc-shaped.

In particular, the ferromagnetic core 20 and respective electrically conductive windings 23a-23d are configured to respond a plurality of H-field signals. The electrically conductive patch element 24 is configured to respond an E-field signal. The electrically conductive patch element 24 does not affect the H-field since the electrically conductive patch element is not a closed electric circuit or loop to ground.

In total, three channels are available in the antenna 16. As perhaps best seen in FIG. 4C, the ferromagnetic core 20 and respective electrically conductive windings 23a-23d, and the electrically conductive patch element 24 are centered, which phase centers the channels. In an example embodiment, the antenna 16 comprises a 6 inch by 6 inch by 3 inch size, which may be readily installed in vehicle platforms.

The eLORAN receiver circuitry 17 is configured to correct a position based upon the plurality of H-field signals and the E-field signal. Of course, this may be in cooperation with the processor 18, but in some embodiments, this correction algorithm may be performed solely within the eLORAN receiver circuitry 17. In some applications, the eLORAN receiver circuitry 17 and the processor 18 may be integrated.

With reference to a flowchart 40, the eLORAN receiver circuitry 17 is configured to measure E-field to H-field antenna channel weights. (Blocks 41-42). More specifically, the E-field and H-field antenna channel weights may comprise amplitude, phase, and pulse timing difference. The eLORAN receiver circuitry 17 is configured to determine whether the E-field and H-field antenna channel weights are within error free range, and if so, no correction is needed (Blocks 43-44) before ending (Block 52). On the other hand, if the E-field and H-field antenna channel weights are not within the error free range, the position correction algorithm is executed. (Block 45).

The eLORAN receiver circuitry 17 is configured to calculate an E-field to H-field amplitude ratio, an E-field to H-field phase difference, and an E-field to H-field pulse arrival time difference. (Block 46). The eLORAN receiver circuitry 17 is configured to access a look-up table of expected propagation error and needed correction factor. (Block 47). The look-up table comprises a plurality of input parameters, including one or more of E-channel amplitude, E-channel phase, NS H-channel amplitude, NS H-channel phase, EW H-channel amplitude, and EW H-channel phase.

The eLORAN receiver circuitry 17 is configured to, if the error is within a correctable range, correct the position based upon the E-field to H-field amplitude ratio, the E-field to H-field phase difference, and the E-field to H-field pulse arrival time difference. (Blocks 49, 51-52). If the error is not within the correctable range, the eLORAN receiver circuitry 17 is configured to calculate an extrapolated position (i.e. where position is extrapolated over time based on previous eLORAN location data), and if not possible, then display an error or null position. (Block 50, 52).

In the illustrated embodiments, the antenna 16 comprises an electrically conductive ground plane 25 opposite the electrically conductive patch element 24. As perhaps best seen in FIG. 4C, the electrically conductive ground plane 25 is disc-shaped, in particular, circular disc-shaped.

Figure 4A:
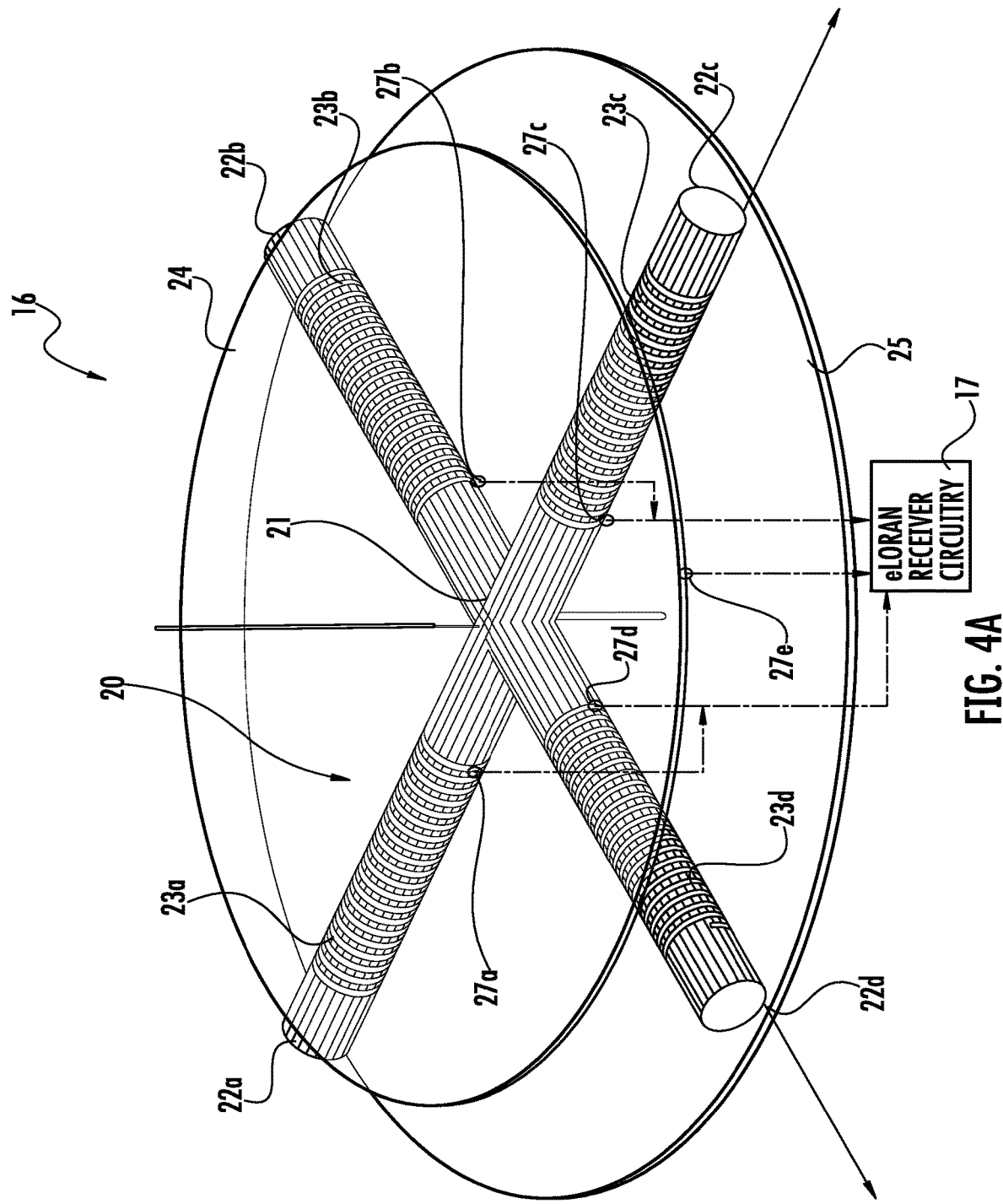
FIG. 4A is a schematic perspective view of the antenna from the eLORAN receiver of FIG. 2.
Figure 4B:
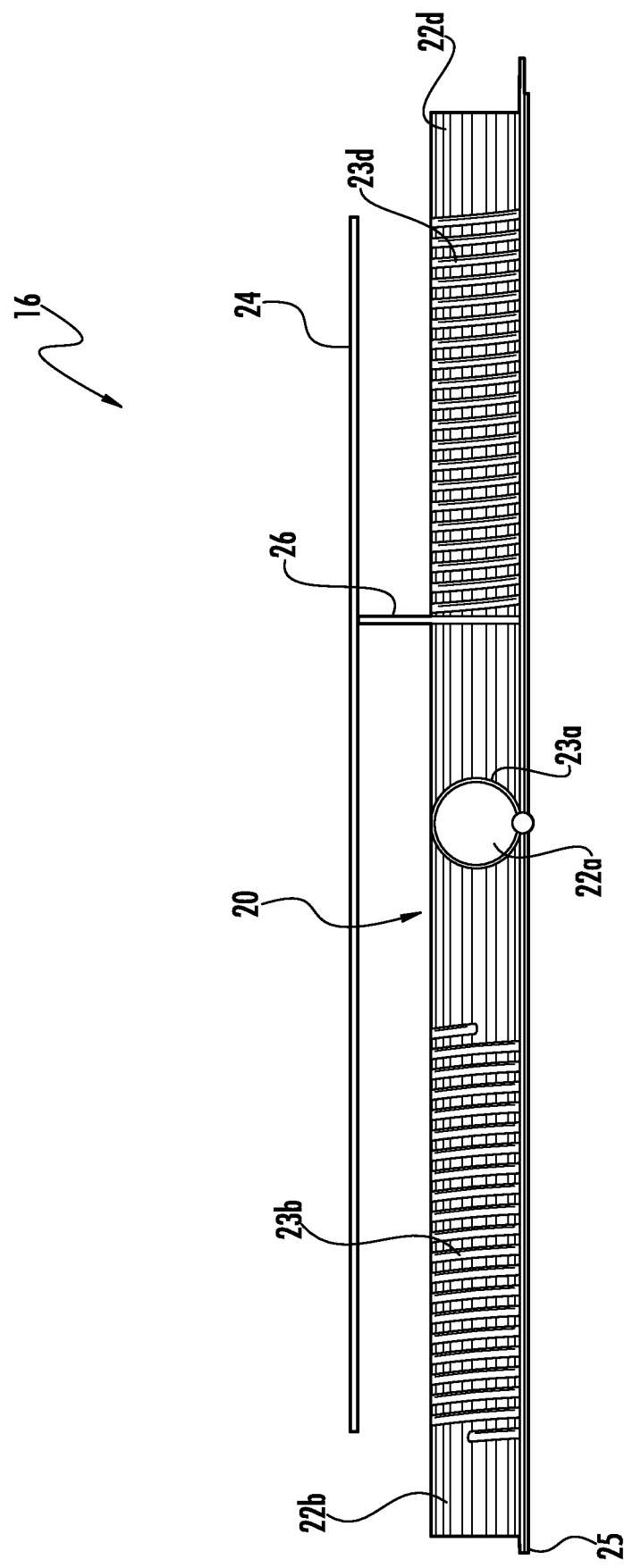
FIG. 4B is a schematic side elevational view of the antenna from the eLORAN receiver of FIG. 2.
Figure 4C:
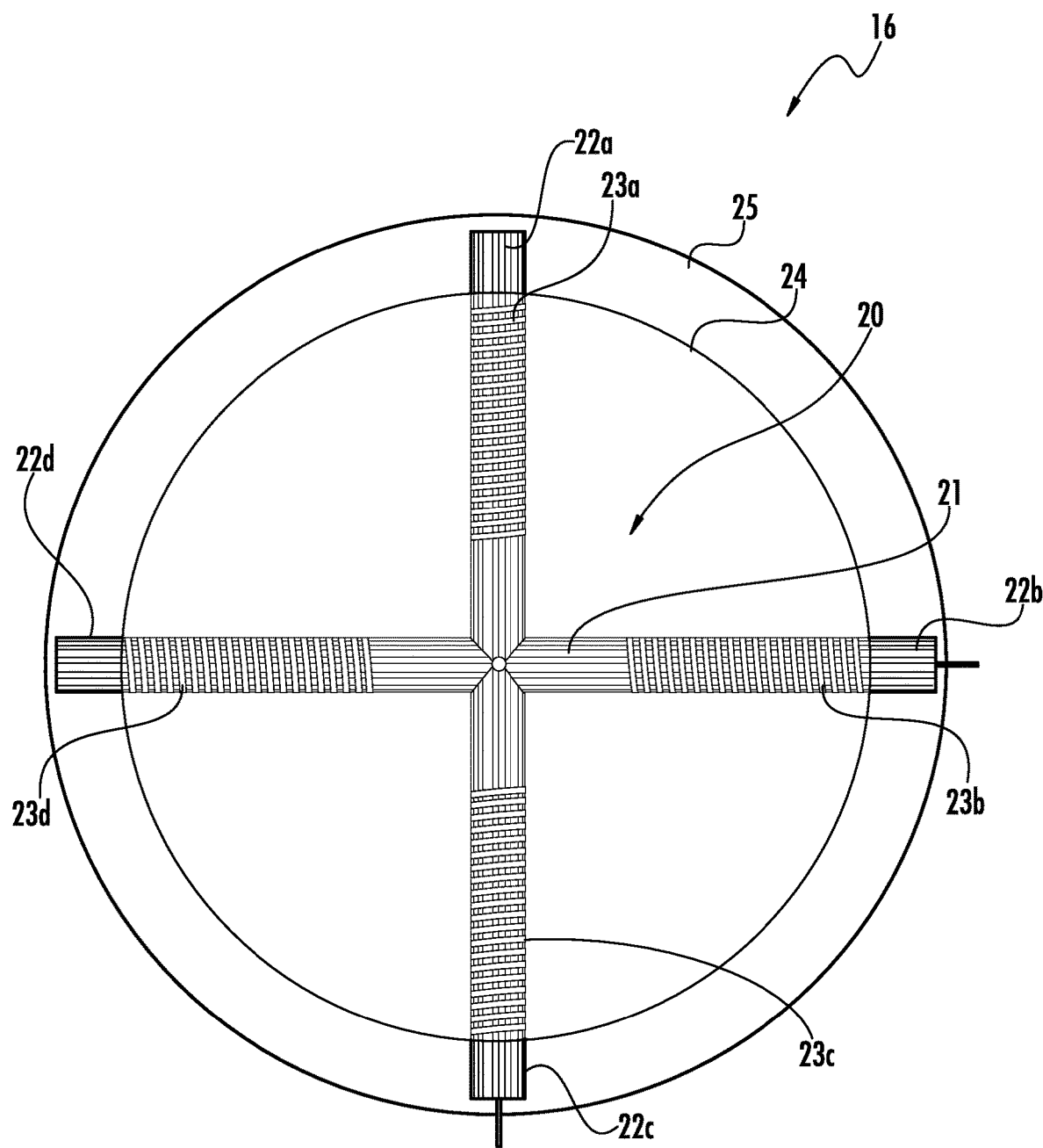
FIG. 4C is a schematic top plan view of the antenna from the eLORAN receiver of FIG. 2.
Figure 5:
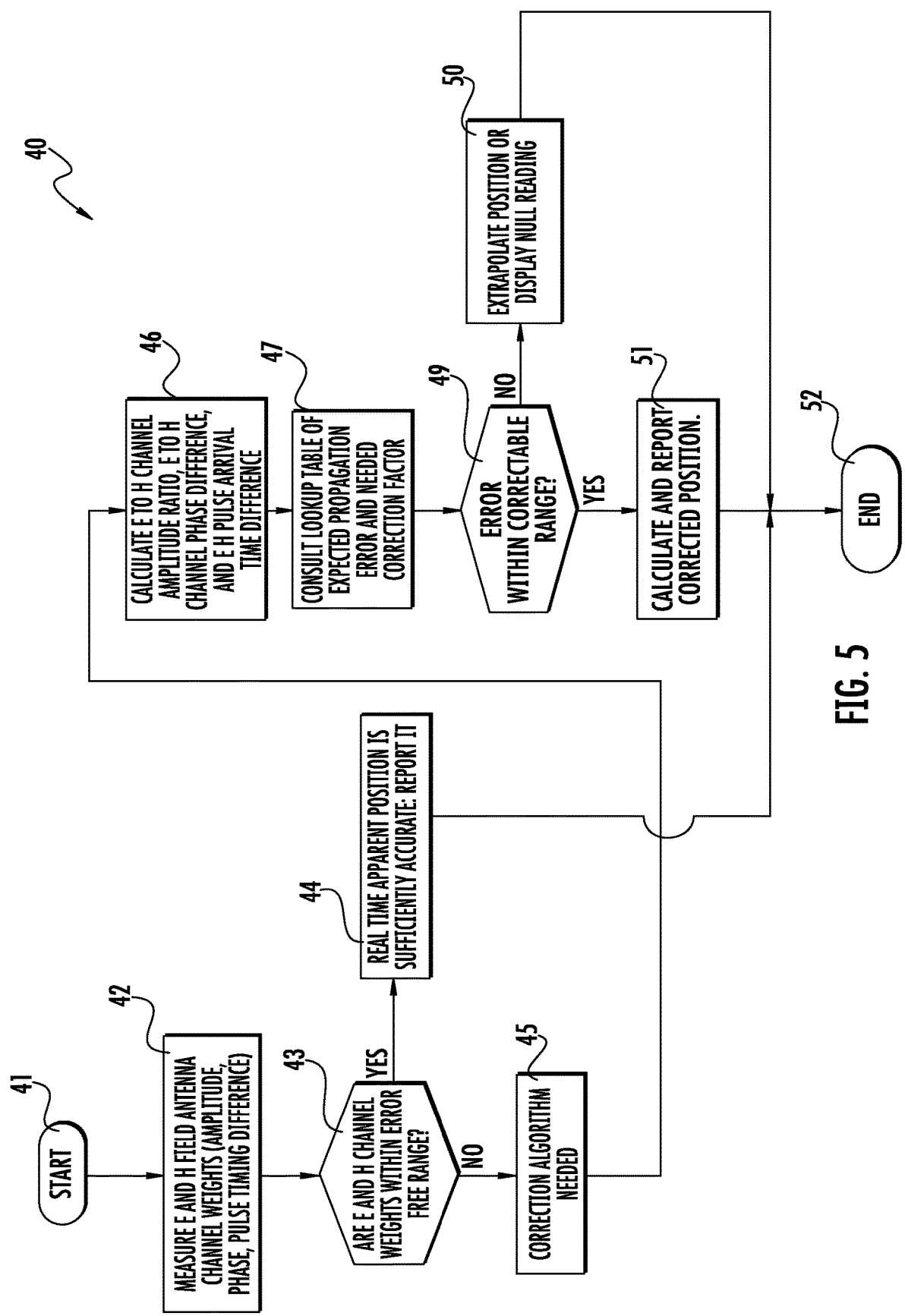
FIG. 5 is a flowchart for a method for correcting position data with the antenna from the eLORAN receiver of FIG. 2.

As perhaps best seen in FIG. 4B, the antenna 16 illustratively includes a vertical support 26 extending between the electrically conductive ground plane 25 and the electrically conductive patch element 24. Referring back to FIG. 4A, the antenna 16 illustratively comprises a plurality of feed points 27a-27d coupled to the respective electrically conductive windings 23a-23d and a feed point 27e coupled to the electrically conductive patch element 24.

Figure 6:
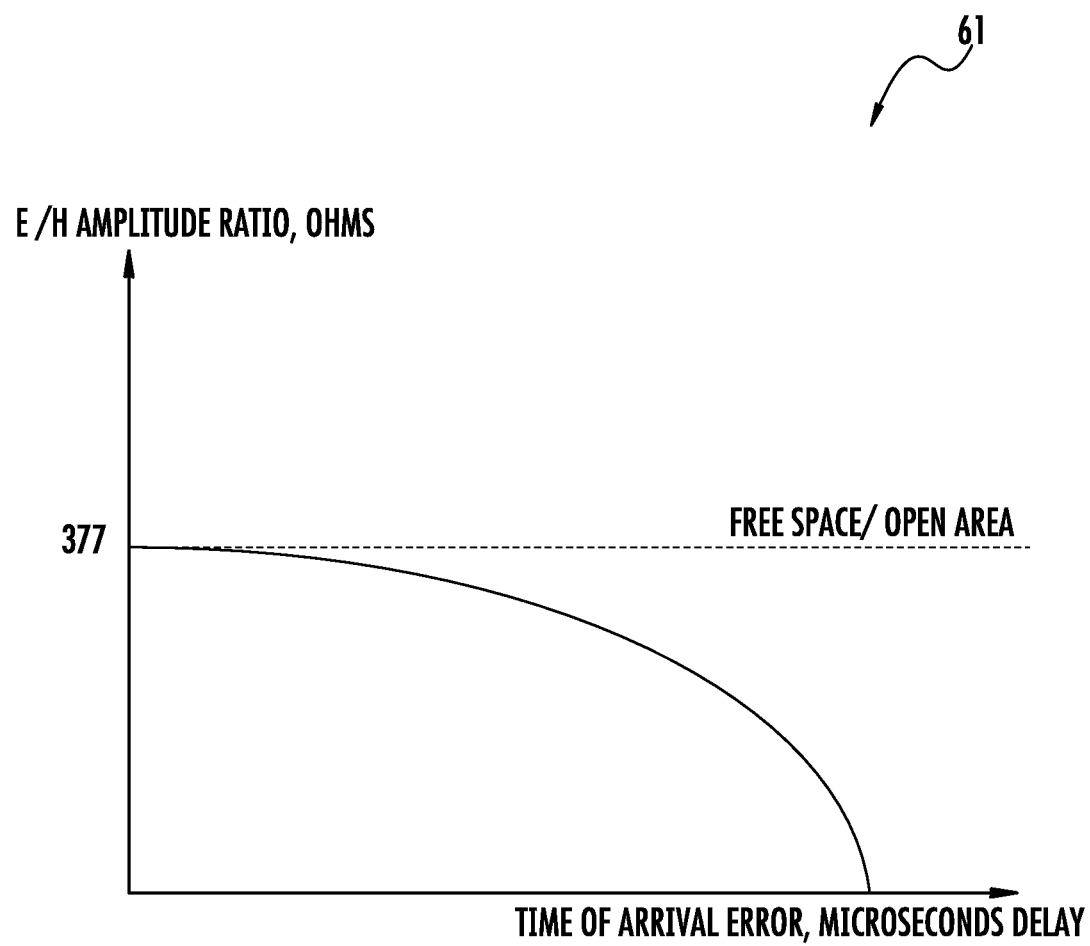
FIG. 6 is a diagram of performance of the antenna from the eLORAN receiver of FIG. 2.

Referring now addition to FIG. 6, a diagram 61 shows E-field to H-field amplitude ratio versus time of arrival error, delay (shown in μs). An E-field to H-field ratio of 377, or nearly so, indicates no obstructions nearby. The E-field to H-field ratio of 377 is the radio wave far field impedance and E-field to H-field ratio in open areas. As shown, there is a rapid decline in E-field amplitude, and a drop in the E-field to H-field ratio indicates overhead obstruction. Although reduced in strength, the E-field is more accurate in these circumstances. The H-field (two H-field antenna, X and Y axis, NS and EW) provide angle of arrival estimation to indicate the device has not suddenly changed orientation allowing position extrapolation. The E-field is most impacted in canyons and amid tall buildings, and H-field may be more heavily weighted. The H-field is most heavily impacted by closed loop structures, such as bridges, and in those circumstances, the E-field may be more heavily weighted. The H-field angle of arrival indicates the direction of the eLORAN transmitter sites. The diagram 60 relationship may be preprogrammed into the eLORAN communications system 10 with the diagram 60 comprising relationship comprising a correction factor for use by the eLORAN communications system 10. Different geographical regions may have slightly different diagram 60 behaviors so different diagram 60 factors may be used in different geographical regions.

Figure 7:
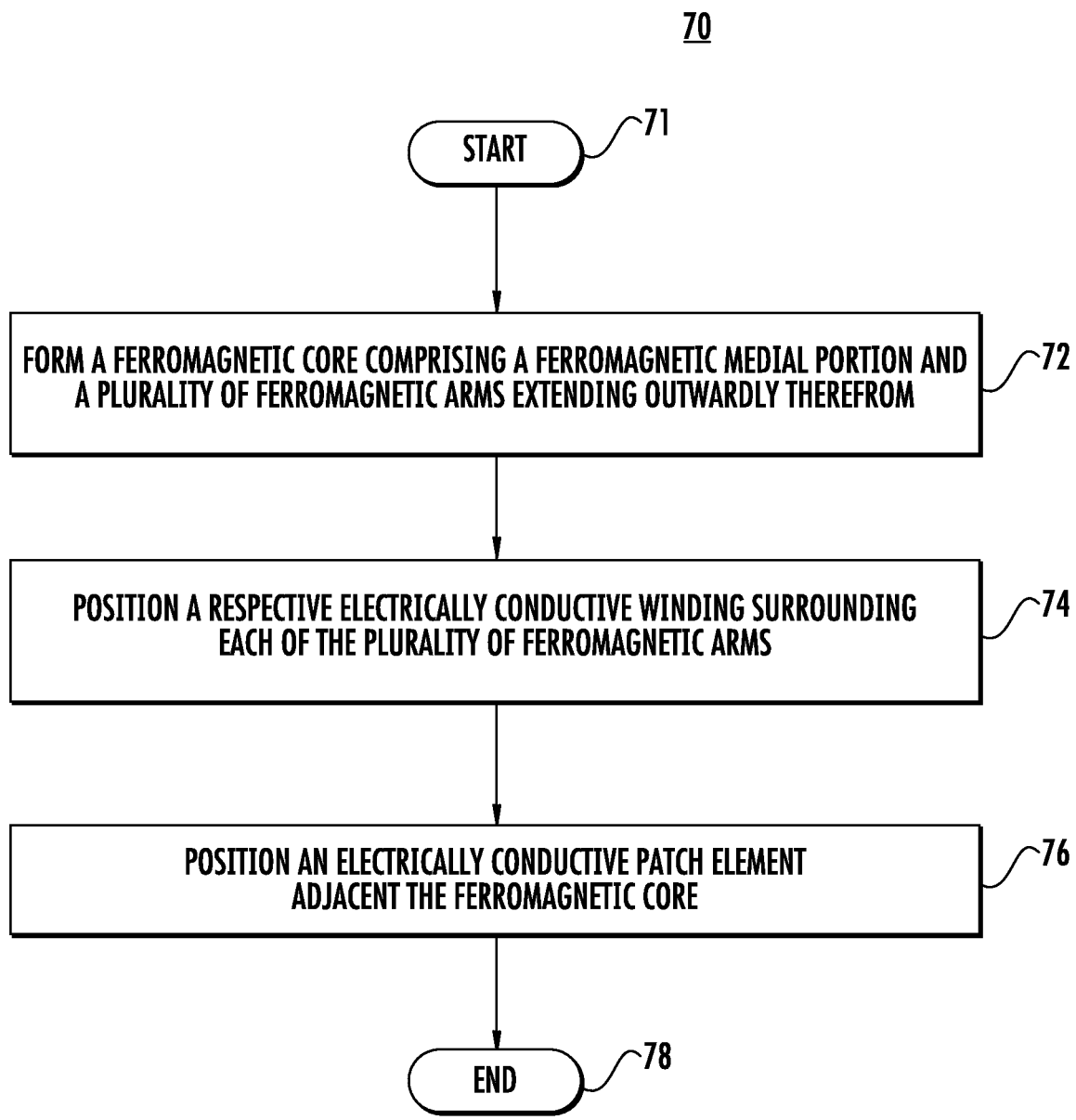
FIG. 7 is a flowchart for a method for making the antenna from the eLORAN receiver of FIG. 2.

Referring now to FIG. 7, another aspect directed to a method for making the antenna 16 to be coupled to eLORAN receiver circuitry 17. The method is now described with reference to a flowchart 70. The method includes forming a ferromagnetic core 20 comprising a ferromagnetic medial portion 21 and a plurality of ferromagnetic arms 22a-22d extending outwardly therefrom, and positioning a respective electrically conductive winding 23a-23d surrounding each of the plurality of ferromagnetic arms. (Blocks 71-72, 74). The method comprises positioning an electrically conductive patch element 24 adjacent the ferromagnetic core 20. (Blocks 76, 78).

Other features relating to communication systems are disclosed in co-pending applications: Ser. No. 16/013,106, titled "ELORAN RECEIVER WITH FERROMAGNETIC BODY AND RELATED ANTENNAS AND METHODS," and Ser. No. 15/980,857, "TOWER BASED ANTENNA INCLUDING MULTIPLE SETS OF ELONGATE ANTENNA ELEMENTS AND RELATED METHODS," which are incorporated herein by reference in their entirety.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An enhanced LOng-RAnge Navigation (eLORAN) receiver comprising:
    an antenna and eLORAN receiver circuitry coupled thereto, the antenna configured to receive an eLORAN broadcast signal and comprising
        a ferromagnetic core comprising a ferromagnetic medial portion and a plurality of ferromagnetic arms extending outwardly therefrom,
        a respective electrically conductive winding surrounding each of the plurality of ferromagnetic arms and configured to respond to a respective H-field signal of the eLORAN broadcast signal, and
        an electrically conductive patch element adjacent said ferromagnetic core and configured to respond to an E-field signal of the eLORAN broadcast signal;

the eLORAN receiver circuitry configured to apply a compensation factor for position error correction based upon a difference between an E-field signal amplitude and H-field signal amplitudes.

2. The eLORAN receiver of claim 1 wherein said eLORAN receiver circuitry is configured to calculate an E-field to H-field amplitude ratio, an E-field to H-field phase difference, and an E-field to H-field pulse arrival time difference; and wherein said eLORAN receiver circuitry is configured to correct the position based upon the E-field to H-field amplitude ratio, the E-field to H-field phase difference, and the E-field to H-field pulse arrival time difference.

3. The eLORAN receiver of claim 1, wherein said electrically conductive patch antenna is adjacent a first side of said ferromagnetic core; and wherein said antenna comprises an electrically conductive ground plane adjacent a second side of said ferromagnetic core opposite the first side thereof.

4. The eLORAN receiver of claim 1 wherein said plurality of ferromagnetic arms are arranged in aligned pairs.

5. The eLORAN receiver of claim 1 wherein said antenna comprises at least one feed point coupled to said respective electrically conductive winding and said electrically conductive patch element.

6. The eLORAN receiver of claim 1 wherein said electrically conductive patch element is disc-shaped.

7. The eLORAN receiver of claim 1 wherein said plurality of ferromagnetic arms defines a cross-shape.

8. The eLORAN receiver of claim 1 wherein said ferromagnetic core comprises at least one of ferrite, powdered iron, electrical steel, and nanocrystalline iron.

9. An antenna to be coupled to enhanced LOng-RAnge Navigation (eLORAN) receiver circuitry, the antenna configured to receive an eLORAN broadcast signal, the antenna comprising:
    a ferromagnetic core comprising a ferromagnetic medial portion and a plurality of ferromagnetic arms extending outwardly therefrom;
    a respective electrically conductive winding surrounding each of the plurality of ferromagnetic arms and configured to respond to a respective H-field signal of the eLORAN broadcast signal;
    an electrically conductive patch element adjacent a first side of said ferromagnetic core and configured to respond to an E-field signal of the eLORAN broadcast signal; and
    an electrically conductive ground plane adjacent a second side of said ferromagnetic core opposite the first side thereof.

10. The antenna of claim 9 wherein the eLORAN receiver circuitry is configured to correct a position based upon the plurality of H-field signals and the E-field signal.

11. The antenna of claim 10 wherein the eLORAN receiver circuitry is configured to calculate an E-field to H-field amplitude ratio, an E-field to H-field phase difference, and an E-field to H-field pulse arrival time difference; and wherein the eLORAN receiver circuitry is configured to correct the position based upon the E-field to H-field amplitude ratio, the E-field to H-field phase difference, and the E-field to H-field pulse arrival time difference.

12. The antenna of claim 9 wherein said plurality of ferromagnetic arms are arranged in aligned pairs.

13. The antenna of claim 9 further comprising at least one feed point coupled to said respective electrically conductive winding and said electrically conductive patch element.

14. A method for making an enhanced LOng-RAnge Navigation (eLORAN) receiver configured to receive an eLORAN broadcast signal, the method comprising:
    forming a ferromagnetic core comprising a ferromagnetic medial portion and a plurality of ferromagnetic arms extending outwardly therefrom;
    positioning a respective electrically conductive winding surrounding each of the plurality of ferromagnetic arms and configured to respond to a respective H-field signal of the eLORAN broadcast signal;
    positioning an electrically conductive patch element adjacent the ferromagnetic core and configured to respond to an E-field signal of the eLORAN broadcast signal: and
    coupling eLORAN receiver circuitry to the respective electrically conductive winding and patch element to apply a compensation factor for position error correction based upon a difference between E-field signal and H-field signal amplitudes.

* * * * *